Figure 1:
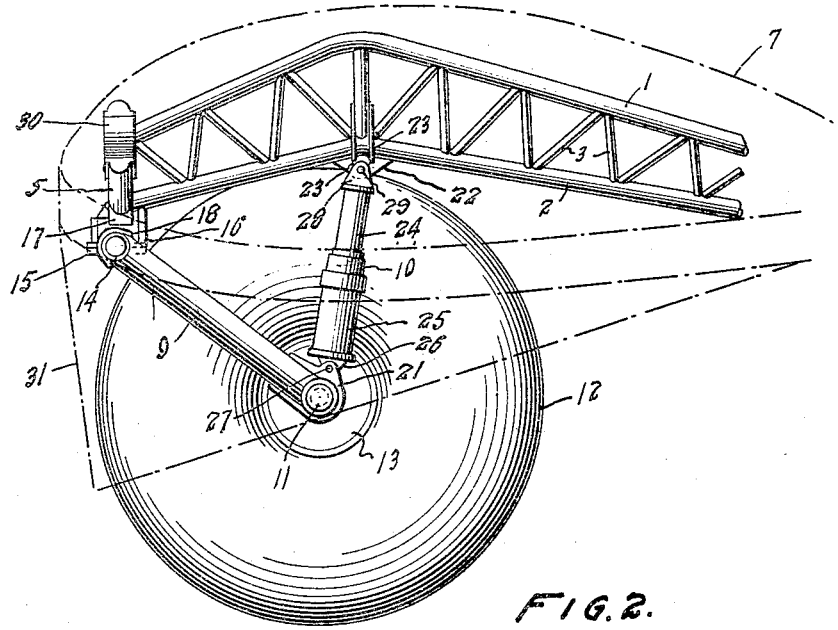

March 14, 1933.  G. M. BELLANCA  1,901,795

AIRPLANE LANDING GEAR

Filed Aug. 10, 1931

Inventor

GIUSEPPE M. BELLANCA

By Semmes & Semmes

Attorneys

Patented Mar. 14, 1933

1,901,795

UNITED STATES PATENT OFFICE

GIUSEPPE M. BELLANCA, OF NEW CASTLE, DELAWARE

AIRPLANE LANDING GEAR

Application filed August 10, 1931. Serial No. 556,254.

This invention relates in general to airplanes, and more particularly has reference to a novel landing gear therefor.

The present application is a continuation in part of my copending application for airplane construction, Serial No. 459,246, filed June 7, 1930.

Previous to this time, as is fully set forth in my aforementioned application, aircraft landing wheels have usually been mounted on a gear, serving no other useful purpose than to carry the wheels. The landing gear heretofore used has, in fact, usually detracted from the efficiency of an airplane by reason of its weight and air resistance.

I have provided a landing gear consisting of lift surfaces for carrying landing wheels, adapted to increase the efficiency of an airplane in flight, as well as to serve as a mounting for the wheels. It is to the actual assembly of the wheels on the gear that the present invention is directed.

There is a well recognized tendency of aircraft moving over the ground to nose over, especially on landing. This condition particularly obtains when obstructions are encountered by the wheels, or when the rotation of the wheels is impeded, such as with the application of brakes.

It is the accepted practice in present construction to provide shock absorbers on the landing gear to relieve the strains on an aircraft resulting from taking off and landing. The prior types of shock absorbers have not been generally adapted to compensate for obstructions encountered by the wheels to prevent nosing over of an airplane. To overcome this difficulty, a landing gear has been devised wherein the landing wheels are mounted on a triangular framework, pivotally and resiliently connected to an airplane, so that the frame by reason of its pivotal and resilient ends may move through an arc when obstructions are encountered by the wheels, or on the application of brakes, both to cushion landing, or taking off shocks and to prevent nosing over of the airplane. The flexible types of mountings employed, however, have been of a character having a tendency to move laterally. This is manifestly an exceedingly disadvantageous feature, inasmuch as such lateral movement gives rise to ground looping with consequent serious damage to aircraft.

An object of this invention is to provide an airplane landing gear, adapted to compensate for obstructions encountered by the wheels, or for retardation of the same, to prevent an airplane from nosing over.

Another object of this invention is to provide an airplane landing gear of a character to compensate for the tendency of an airplane to nose over on taking off or landing, held against lateral movement, giving rise to ground looping.

A further object of this invention is to provide an airplane landing gear having shock absorbers formed on gear struts.

A still further object of this invention is to provide an airplane landing gear supported by lift surfaces.

A still further object of this invention is to provide an airplane landing gear faired in an airplane lift surface.

With these and other objects in view, which may be incident to my improvements, the invention consists in the parts and combination to be hereinafter set forth and claimed, with the understanding that the several necessary elements comprising my invention may be varied in construction, proportions and arrangement without departing from the spirit and scope of the appended claims.

In order to make my invention more clearly understood, I have shown in the accompanying drawing, means for carrying the same into practical effect without limiting the improvements in their useful applications to the particular constructions which, for the purpose of explanation, have been made the subject of illustration.

In the drawing, Figure 1 is a side elevational view of my landing gear, shown mounted on a wing rib, forming a fairing, shown in plan.

Figure 2:
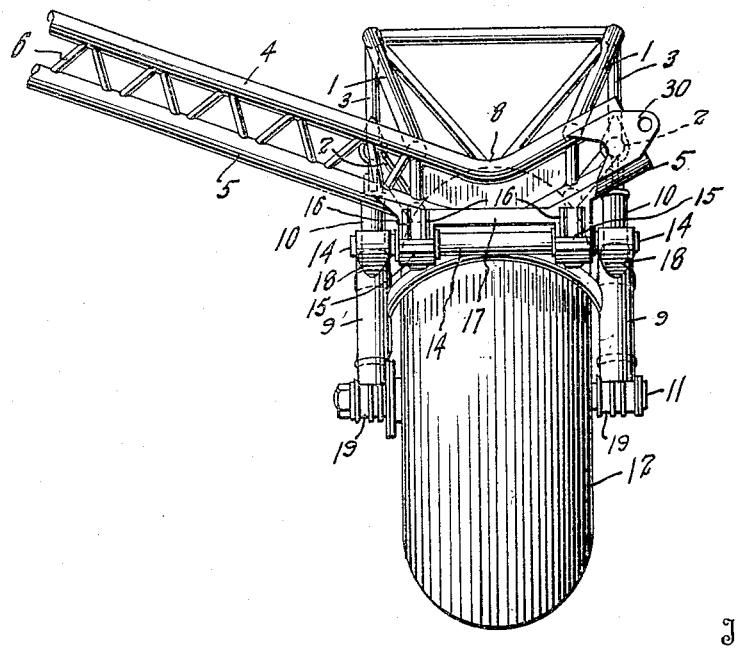

Figure 2 is a front view of the showing in Figure 1.

My landing gear, as has been previously explained, is especially adapted for mounting on the outer extremities of stub wings adjacent the connection thereof to lift struts, as is shown in my copending application. It will be appreciated, however, that the landing gear may be mounted on any other type of wing, or suitably mounted directly or indirectly on an airplane fuselage.

Referring more particularly to the drawing, and especially to Figure 1, there is shown a rib of an airplane wing comprising angular top and bottom members 1 and 2 connected by angularly arranged cross braces 3. The specific wing assembly shown is that employed in the construction of the stub wing shown in my copending application.

The present invention is of course in no wise limited to the particular wing construction shown, which is merely illustrated as a type I have found advantageous for use in connection with my novel landing gear. The wing is, in the conventional manner, fabricated of a series of ribs, such as that described, connected between a front spar composed of upper and lower tubular sections 4 and 5, as shown in Figure 2, joined by angularly arranged cross braces 6, and a similar rear spar (not shown).

The members forming the ribs and spars and interconnecting braces are preferably composed of conventional hollow metal tubing of high tensile strength, yet light in weight, the joints between the same being welded. The wing is surfaced with a covering 7, as shown in plan in Figure 1, which may be fabric or metal, applied over suitable form producing members associated with the wing spars and ribs.

In the construction shown, the inner ends of stub wings, formed by the spars and struts described, are adapted to be angularly mounted on opposite lower edges of an airplane fuselage beneath a main wing, as is illustrated in my copending application. The stub wings are formed with angular upwardly extending portions adjacent the outer extremities formed by a bend in the members forming the spars, as is indicated at 8 in Figure 2.

Lift struts (not shown), but fully described in my copending application, are adapted to be pivotally connected between the outer ends of the stub wing and the under side of the main wing (not shown).

My novel landing gear is adapted to be mounted on the stub wings adjacent the outer extremities thereof across the point of curvature therein. Manifestly, as has been previously pointed out, however, the gear may be modified for mounting on any other suitable portion of an airplane structure.

The landing gear comprises corresponding sets of pairs of angularly arranged struts 9 and 10, as shown in Figure 1, pivoted at the ends to the front spar formed of the members 4 and 5 on the leading edge of each stub wing at its outer extremity, and on the lower members 2 of a pair of ribs, rear of the leading edge, respectively. The lower ends of each of the corresponding pairs of struts are pivoted together, and the pairs of front struts 9 are provided with journals for receiving axles 11, for carrying wheels 12. The wheels 12 are preferably of the type comprising an oversized tire mounted on a collared sleeve 13, commercially known as "air wheels", to aid in cushioning the shock incident to taking off and landing.

Landing gears of a somewhat similar type have been provided in the past with a rigid connection between the pairs of struts 9 and 10, and a resilient connection between one or the other of the pairs of struts and the member on the airplane to which the same are connected. For such a resilient connection, I propose to substitute pairs of oleo struts for one of the pairs of rigid struts heretofore used for these members. In this manner, the struts may be more satisfactorily anchored, and, in the elimination of the mounting elements previously essential, the assembly simplified. In addition, lateral movement of the struts, which often has a tendency to give rise to ground looping, is prevented by reason of the type of mounting I employ, fixed against lateral movement.

In accordance with my invention, therefore, the ends of the struts 9 are journaled on horizontally arranged axles 14, fixed on the bottom members 5 of the spars on the leading edges of the stub wings, across the point of curvature 8 in the members 5. The axles 14 are attached to the members 5 by mounting in split bearings 15, fixed by bolts (not shown) in bosses 16 formed on member 17, suitably connected to the undersides of the member 5, such as by welding.

The struts 9 having the axles 14 journaled therein at the top ends at 18 are provided with journals 19 at the lower ends to receive the axles 11 for carrying the wheels 12 as previously explained. The lower ends of the struts 9 are further provided with ears 21 extending around the ends thereof. The lower ends of the struts 10 are adapted to be pivoted to the ears on the lower ends of the struts 9. The top ends of the struts 10 are pivoted to the undersides of bottom members 2 forming adjacent wing ribs on plates 22, fixed on the wing ribs by straps 23.

The struts 10 comprise upper and lower telescopic sections 24 and 25 forming a conventional oleo strut. Manifestly, some other type of shock absorbing strut may be substituted therefor. The members 25 are provided with projections 26 at their lower ends for pivoting between the ears 21 on the lower ends of the struts 9 by pins 27. The upper members 24 are provided with ears 28 at the tops for pivoting on the members 23 connected to the wing ribs by pins 29.

Lift struts (not shown), as shown in my copending application, are adapted to be pivoted between the underside of the main wing and the outer extremities of the stub wings. Journaled blocks 30 are welded or otherwise mounted between the tubular members forming the wing spars, at the ends of the same for receiving pins fitted in similar blocks provided in the ends of the lift struts. The landing gear and the upper portions of the wheels are adapted to be enclosed by a faired apron 31 suitably anchored on the stub wings, to decrease the air resistance of the landing gear assembly.

There is accomplished by this invention a landing gear for an airplane adapted to be mounted on members imparting lift to the airplane, in which shocks incident to taking off and landing are compensated for by oleo struts forming part of the structure of the gear, the same being mounted against lateral movement to reduce the likelihood of ground looping of the aircraft.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A landing gear for aircraft comprising an individual frame, one member of which is pivotally connected at a forward part to an aircraft wing, and the other member having telescopic sections connected at a rearward part to said aircraft, a ground contact means connected to said frame, and an outer streamlined shell enclosing said frame.

2. In an airplane landing gear, pairs of substantially V-shaped frames for receiving a wheel between each pair mounted on a wing, each pair of corresponding frame members comprising telescopic sections.

3. In an airplane landing gear, pairs of frames forming in conjunction with the wing, substantially triangular frames for receiving a wheel between each pair of the corresponding pairs of frame members comprising telescopic sections.

4. In an airplane landing gear, a wing rib, a pair of struts pivoted at one end to the rib, the other ends of the struts being pivotally connected, and being associated with a journal for receiving the axle of a landing wheel, and one of the struts being an oleo strut.

5. An airplane landing gear comprising a wheel, a pair of struts on each side of the wheel for carrying same, the front struts providing a pivotal connection to a wing and the rear struts having telescopic sections providing a resilient connection to the wing.

6. An airplane landing gear comprising a wheel, a pair of struts on each side of the wheel, said struts being joined at one end to carry said wheel, the front struts providing a pivotal connection to a wing at their other ends and the rear struts having telescopic sections providing a resilient connection to the wing at their other ends.

7. An airplane landing gear comprising a wheel, a pair of struts on each side of the wheel for carrying same to prevent lateral movement thereof, said struts being connected to a stub wing at the termination thereof, the front struts providing a pivotal connection to the stub wing and the rear struts having telescopic sections providing a resilient connection to the stub wing.

8. An airplane landing gear comprising a wheel, a pair of struts on each side of the wheel adapted to carry same, the front struts providing a pivotal connection to a wing and the rear struts having telescopic sections providing a resilient connection to the wing to the rear of the vertical axis of the wheel.

9. An airplane landing gear comprising a wheel, a frame for mounting the wheel; the frame comprising a plurality of pairs of struts; one pair being positioned on each side of the wheel, and one strut of each pair comprising a telescopic member, and means to attach the frame to a wing of an airplane.

10. An airplane landing gear comprising a wheel, a pair of substantially V-shaped frames for receiving the wheel between each pair; each member of each pair being pivotally connected at one end to an airplane wing and being pivotally connected at the other end to another said member of said pair, at least one member of each pair comprising a resilient and telescopic strut.

In testimony whereof I affix my signature.

GIUSEPPE M. BELLANCA.